United States Patent [19]
DiGangi, Jr.

[11] Patent Number: 5,269,672
[45] Date of Patent: Dec. 14, 1993

[54] SERVO STRETCH ASSEMBLY FOR BLOW MOLDING MACHINE

[75] Inventor: Vincent R. DiGangi, Jr., Rahway, N.J.

[73] Assignee: Hoover Universal, Inc., Plymouth, Mich.

[21] Appl. No.: 905,624

[22] Filed: Jun. 29, 1992

[51] Int. Cl.⁵ .............................................. B29C 49/12
[52] U.S. Cl. ...................................... 425/150; 425/529
[58] Field of Search ............... 425/150, 529, 530, 534, 425/535; 264/529, 532

[56] References Cited

U.S. PATENT DOCUMENTS

| | | | |
|---|---|---|---|
| 4,009,980 | 3/1977 | Armour et al. | 425/529 X |
| 4,036,573 | 7/1977 | Kauffman et al. | 425/535 X |
| 4,304,542 | 12/1981 | Sauer | 425/535 X |
| 4,409,161 | 10/1983 | Harry et al. | 425/529 X |
| 5,129,815 | 7/1992 | Miyazawa et al. | 425/529 |
| 5,169,705 | 12/1992 | Coxhead et al. | 425/529 X |

Primary Examiner—Richard L. Chiesa
Attorney, Agent, or Firm—Harness, Dickey & Pierce

[57] ABSTRACT

A servo stretch assembly for blow molding hollow injection molded preforms in which the stretch rod is driven by a servo motor that is electronically controlled to produce a precise and repeatable stretch stroke and stretch profile.

8 Claims, 2 Drawing Sheets

SERVO STRETCH ASSEMBLY FOR BLOW MOLDING MACHINE

BACKGROUND AND SUMMARY OF THE INVENTION

The present invention relates to a stretch assembly used in stretching preforms in a blow molding machine and in particular to a stretch assembly driven by a servo motor.

In the production of bottles by blow molding an injection molded preform, it is often necessary to stretch the preforms longitudinally at the time of or immediately before blow molding. Such stretching is necessary to produce the needed molecular orientation in the resin. Longitudinal stretching of preforms is accomplished by inserting a stretch rod into the open end of each preform and stretching the preform by pushing longitudinally on the preform base. Such stretching is typically performed by a hydraulic or pneumatic actuating cylinder coupled to the stretch rod for moving the rod in and out of the preform.

In the mass production of bottles, it is desired that the bottles be uniform to the greatest extent possible. With the use of an actuating cylinder for moving the stretch rod, the desired uniformity is not always possible and certain limits exist in the ability to control the stretch rod movement. For example, the speed at which the cylinder and a stretch rod move, for a given operating pressure, depends upon the resistance met by the stretch rod. The resistance to stretching will vary with many factors including the temperature of the preform and the number of preforms being stretched. If one or more preforms have been dropped and only a portion of the total compliment is at the blowing station, the resistance to travel will be reduced, increasing the speed of stretching. Furthermore, with an actuating cylinder, it is difficult if not impossible to vary the stretch rate during stretching or to start and stop the motion of the stretch rods during the stretch stroke in an accurate and repeatable manner.

Accordingly, it is an object of the present invention to provide a stretch assembly that is controllable to vary the speed of travel of the stretch rod as well as to accurately control the start and stop of stretch rod movement to provide uniform preform stretching to produce containers having greater uniformity.

It is a feature of the present invention to drive the stretch assembly with a servo motor that is electronically controlled and programmable for the purpose of starting, stopping and controlling the speed of the stretch rod travel.

It is a feature of the servo driven stretch assembly that cam actuated valves on the stretch stroke can be utilized for activating the flow of blow air in an accurate and repeatable manner. Furthermore, electronic controls based on the servo location can be used in place of the cam actuated mechanical valves if desired.

It is an advantage of the servo control stretch assembly of the present invention that prior to the beginning of preform stretching, the stretch rod can be preset in position within the preform, immediately adjacent to the preform base during the process of closing the blow mold assembly, thus reducing the total cycle time by performing multiple operations at one time.

It is a further advantage that customized stretch profiles can be used for different containers.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
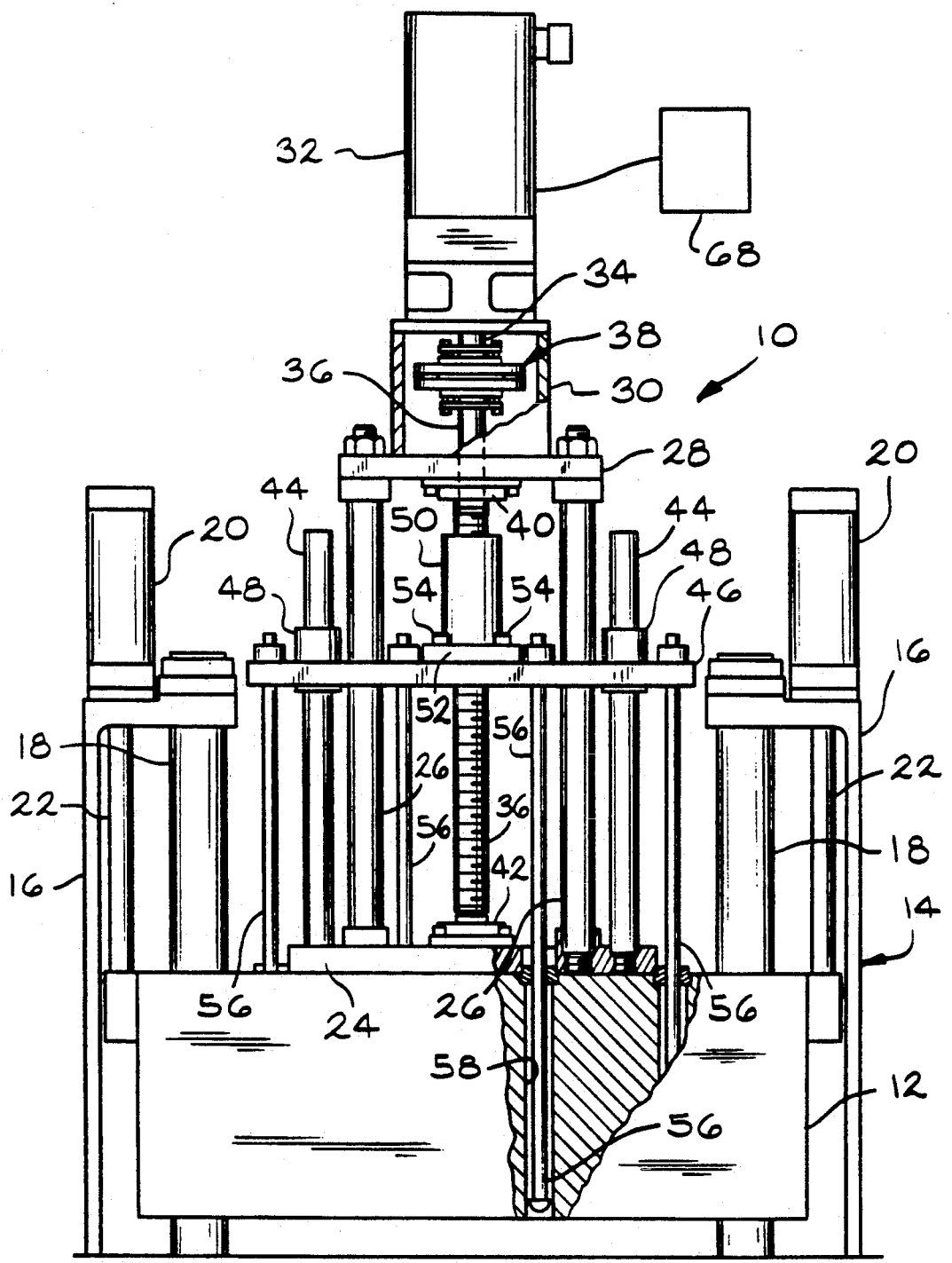
FIG. 1 is an elevational/partial sectional view of the servo stretch assembly of the present invention.

The servo stretch assembly of the present invention is shown in FIG. 1 and designated generally at 10. Stretch assembly 10 is shown mounted to a cross head 12 of a stuffer assembly 14 of a reheat blow molding machine. The stuffer assembly 14 includes upright posts 16 supporting guide rods 18 and actuating cylinders 20. The actuating cylinders are connected through their piston rods 22 to the cross head 12 for moving the cross head up and down as guided by the rods 18. In its lowered position, the cross head engages the top of the mold clamp.

The servo stretch assembly of the present invention is mounted upon the top of the cross head 12 and thereby moves up and down with the cross head. The stuffer assembly 14 is shown to provide an environment for the servo stretch assembly of the present invention. The specific structure of the stuffer assembly is not pertinent to the present invention and the stretch assembly can be used in blow molding machines not equipped with the stuffer assembly as described.

The stretch assembly includes a base plate 24 secured to the top of the cross head 12 upon which the stretch assembly is constructed. The stretch assembly includes a pair of tie rods 26 attached to the base plate and extending upwardly therefrom to a drive bracket 28. A box frame 30 mounted to the drive bracket supports the servo motor 32. The output shaft 34 of the servo motor is coupled to a ball screw shaft 36 through a flexible disc coupling 38. The screw shaft 36 passes through a flanged taper roller bearing 40 at the drive bracket 28 and extends to a flanged ball bearing 42 at the base plate 24.

A pair of guide rods 44 are also mounted to the base plate and extend upwardly therefrom. The guide rods 44 are used to guide vertical movement of a bridge plate 46 spanning over the cross head 12. Bushings 48 are carried by the bridge plate for sliding contact with the guide rods 44. The bridge plate includes apertures through which the tie rods 26 pass. A ball nut 50 is attached to the bridge plate through flange 52 and cap screws 54. The ball nut 50 is threadably engaged with the ball screw shaft 36 for movement vertically in response to rotation of the screw shaft. The guide rods 44 prevent rotation of the bridge plate resulting in its vertical travel as the screw shaft rotates.

Four stretch rods 56 extend downwardly from the bridge plate and through apertures 58 in the cross head 12. While four stretch rods are shown, the stretch assembly of the present invention can be configured with any number of stretch rods as desired. Upon activation of the servo motor 32, the screw shaft 36 is rotated, causing the ball nut and hence the bridge plate 46 to move axially along the length of the screw shaft. In so doing, the stretch rods 56 are extended below the cross head 12 and into the injection molded preforms 62 shown in FIG. 2.

Figure 2:
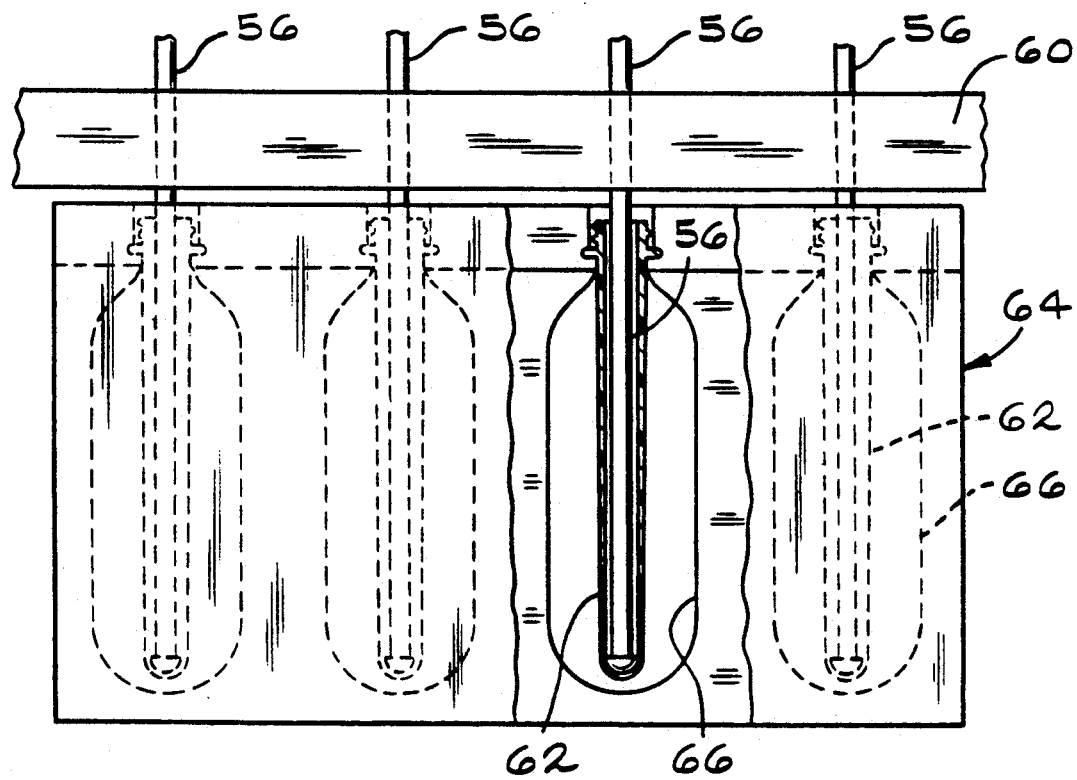
FIG. 2 is an elevational view of a blow mold assembly used in conjunction with the servo stretch assembly of the present invention.

In FIG. 1, the stretch rods are shown raised to a position where the lower ends of the stretch rods are within the cross head 12. In FIG. 2, a pallet assembly 60 is shown which carries the preforms 62 beneath the stuffer assembly and into alignment with a blow mold assembly 64. When the servo motor is activated and the bridge plate lowered, the stretch rods 56 extend into the preforms 62 and stretch the preforms longitudinally within the mold cavities 66 defined by the blow mold assembly. During or immediately after preform stretching, blow air is injected into the preforms to blow the preforms radially outward into contact with the walls of the mold cavities 66.

The servo motor is controlled by an electronic controller 68 which preferably is a programmable microprocessor. The controller 68 regulates the start and stop of operation of the servo motor, the direction of rotation and the speed of rotation. The speed of rotation of the servo motor is determined by the controller and is not influenced by outside factors such as the resistance of the preforms to stretch or the pressure of the fluid used with the actuating cylinder. The speed of the servo motor can be precisely repeated from one cycle to the next. Furthermore, the speed of the servo motor can be varied over the course of the stretching cycle to provide a desired stretching profile that can be changed from one bottle design to the next. If desired, the travel of the stretch rods can be stopped and restarted during a stretch cycle with the start and stop positions of the stretch rods being precisely controlled and repeatable. For example, with the servo motor, it is possible during the mold closing process to insert the stretch rods into the preforms until just before the stretch rods contact the bases of the preforms. After the molds have been completely closed and clamped, the stretching can proceed with the introduction of blow air immediately upon the stretching of the preform. Due to variability in the stopping position of the stretch rods when driven with actuating cylinders, this type of operation could not be performed with the desired repeatability.

The flow of the blow air can be controlled by the use of cam actuated mechanical valves that are acted upon by the movement of the bridge plate during the stretch stroke. Such a control of air flow results in a repeatable stretch and blow cycle. If cam actuated mechanical valves are not desired, electronic controls for the introduction of blow air can be provided based on the servo position. Either method of actuating the blow air can be used to avoid the use of timers typically associated with actuating cylinders.

The servo stretch assembly of the present invention provides precise control of the stretch rod stroke so as to be repeatable to produce multiple identical containers. This is made possible by use of a servo motor in place of an actuating cylinder, enabling the stretch cycle to be electronically controlled in a precise and repeatable manner.

It is to be understood that the invention is not limited to the exact construction illustrated and described above, but that various changes and modifications may be made without departing from the spirit and scope of the invention as defined in the following claims.

I claim:

1. In a machine for blow molding a hollow injection molded preform having an open end and a closed end, a stretch assembly for stretching said preform longitudinally comprising:
    a stretch rod insertable into said preform open end to longitudinally stretch said preform;
    a movable bridge plate to which said stretch rod is mounted, said bridge plate being movable in the longitudinal direction of said preform;
    a servo motor having a rotatable output shaft for moving said movable bridge plate and said stretch rod longitudinally into and out of said preform;
    a threaded screw shaft coupled to said output shaft for rotation with said output shaft and threadably coupled to said bridge plate for moving said bridge plate and said stretch rod longitudinally in response to rotation of said output shaft;
    guide means engaging said bridge plate for preventing rotation of said bridge plate and for guiding longitudinal movement of said bridge plate in response to rotation of said screw shaft; and
    electronic control means for operating said servo motor.

2. The stretch assembly of claim 1 wherein said electronic control means is a programmable microprocessor.

3. The stretch assembly of claim 1 further comprising a flexible disc coupling between said screw shaft and said servo motor output shaft.

4. The stretch assembly of claim 1 further comprising means for mounting said stretch assembly upon a movable cross head of said machine for blow molding above a blow mold assembly.

5. The stretch assembly of claim 4 further comprising tie rods extending from said cross head to support said servo motor with said bridge plate being disposed between said servo motor and said cross head with said tie rods passing through said bridge plate.

6. The stretch assembly of claim 1 further comprising a plurality of stretch rods carried by said bridge plate for simultaneously stretching a plurality of preforms.

7. In a machine for blow molding a hollow injection molded preform having an open end and a closed end in a blow mold assembly, a stretch assembly for stretching said preform longitudinally comprising:
    a stretch rod insertable into said preform open end to longitudinally stretch said preform within said blow mold assembly;
    a threaded screw shaft extending in the longitudinal direction of said preform;
    a movable bridge plate normal to said screw shaft and threadably coupled to said screw shaft, said bridge plate carrying said stretch rod and being spaced from the open end of said preform in said mold assembly;
    guide rods parallel to said screw shaft and extending through said bridge plate for guiding movement of said bridge plate and for preventing rotating of said bridge plate;
    a servo motor having a rotatable output shaft coupled to said screw shaft for rotating said screw shaft to move said stretch rod longitudinally into and out of said preform; and
    programmable microprocessor means for controlling said servo motor.

8. The stretch assembly of claim 7 further comprising a plurality of stretch rods carried by said bridge plate for simultaneously stretching a plurality of preforms.

* * * * *